US008020303B1

(12) United States Patent
Marsh

(10) Patent No.: US 8,020,303 B1
(45) Date of Patent: Sep. 20, 2011

(54) INFANT FEEDING DEVICE

(76) Inventor: Hope R. Marsh, Rifle, CO (US)

( * ) Notice: Subject to any disclaimer, the term of this patent is extended or adjusted under 35 U.S.C. 154(b) by 304 days.

(21) Appl. No.: 12/332,901

(22) Filed: Dec. 11, 2008

(51) Int. Cl.
*A47J 43/28* (2006.01)

(52) U.S. Cl. .............................. 30/324; 30/125; 222/192

(58) Field of Classification Search ............ 30/324–328, 30/141, 125, 123.3, 124; 222/192, 205; D7/653
See application file for complete search history.

(56) References Cited

U.S. PATENT DOCUMENTS

| | | | | |
|---|---|---|---|---|
| 2,252,119 | A * | 8/1941 | Edmonds | 30/123.3 |
| 2,698,996 | A | 1/1955 | Hickerson | |
| 2,837,822 | A * | 6/1958 | Wille | 30/125 |
| 3,259,132 | A * | 7/1966 | Katter | 30/324 |
| 3,473,221 | A * | 10/1969 | Flanders | 30/141 |
| 3,612,358 | A | 10/1971 | Massa | |
| 4,091,965 | A | 5/1978 | Gebhard | |
| 4,880,409 | A | 11/1989 | Winblad et al. | |
| 4,888,188 | A | 12/1989 | Gastner, Sr. et al. | |
| 4,957,226 | A * | 9/1990 | Pacia | 222/205 |
| 5,305,928 | A | 4/1994 | Verdaguer | |
| 5,462,101 | A * | 10/1995 | Mouchmouchian | 222/192 |
| D371,491 | S | 7/1996 | Stein | |
| 5,682,931 | A | 11/1997 | Mouchmouchian | |
| 5,713,104 | A * | 2/1998 | Giampaolo, Jr. | 16/422 |
| 5,975,305 | A * | 11/1999 | Barger | 30/326 |
| 6,279,233 | B1 | 8/2001 | Cameron | |
| 2003/0213132 | A1* | 11/2003 | Frazer | 30/123 |
| 2004/0006874 | A1 | 1/2004 | Kamm et al. | |
| 2009/0183371 | A1* | 7/2009 | Mileti et al. | 30/41.5 |

* cited by examiner

*Primary Examiner* — Stephen Choi

(57) ABSTRACT

A infant feeding device includes a tube that has a first end, a second end and a peripheral wall extending between the first and second ends. Each of the first and second ends is open. A conduit is fluidly coupled to the second end. A spoon head is attached to a distal end of the conduit with respect to the second end of the tube. The spoon head is positioned to receive food material transferred through the conduit from the tube. A container containing food material is couplable to the first end of the perimeter wall to supply the tube with the food material so that the food material can be fed to an infant with the spoon head.

5 Claims, 3 Drawing Sheets

INFANT FEEDING DEVICE

BACKGROUND OF THE INVENTION

Field of the Invention

The present invention relates to food receiving infant feeding devices and more particularly pertains to a new food receiving infant feeding device for assisting a person in feeding an infant.

SUMMARY OF THE INVENTION

The present invention meets the needs presented above by generally comprising a tube that has a first end, a second end and a peripheral wall extending between the first and second ends. Each of the first and second ends is open. A conduit is fluidly coupled to the second end. A spoon head is attached to a distal end of the conduit with respect to the second end of the tube. The spoon head is positioned to receive food material transferred through the conduit from the tube. A container containing food material is couplable to the first end of the perimeter wall to supply the tube with the food material so that the food material can be fed to an infant with the spoon head.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
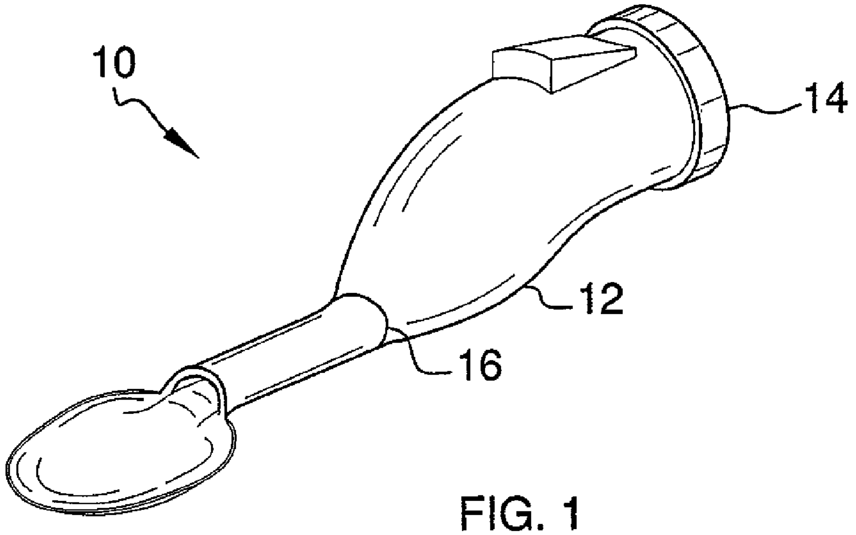
FIG. 1 is a top perspective view of an infant feeding device according to the present invention.
Figure 2:
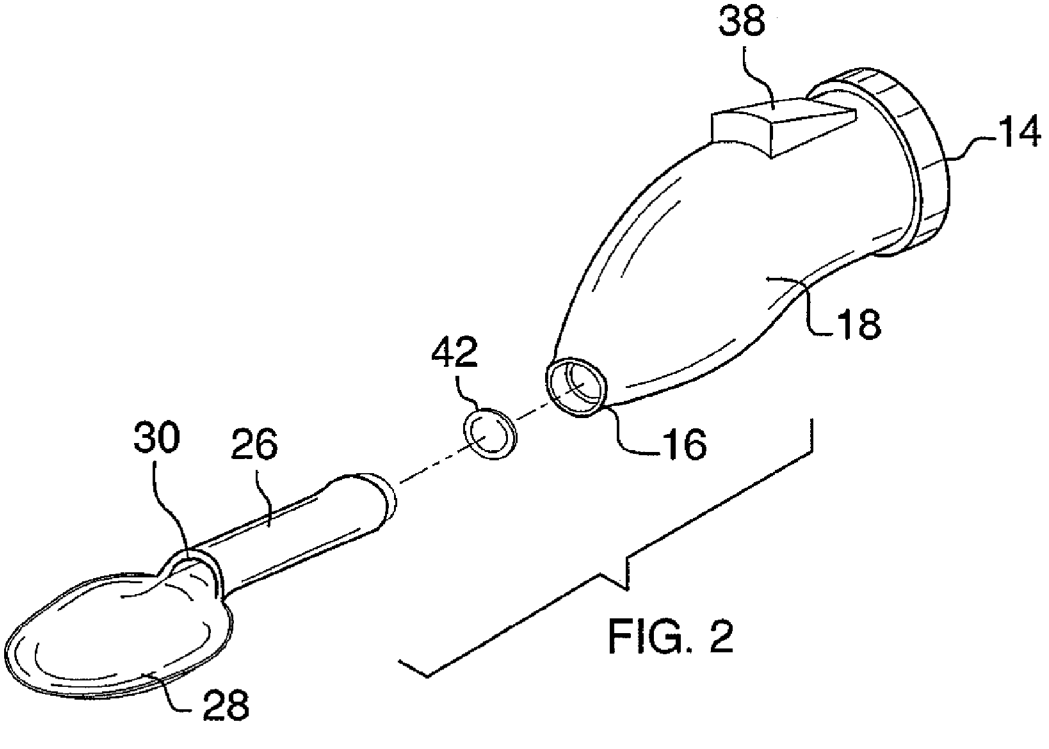
FIG. 2 is an expanded perspective view of the present invention.
Figure 3:
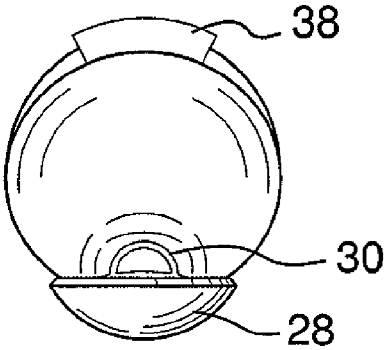
FIG. 3 is a front view of the present invention.
Figure 4:
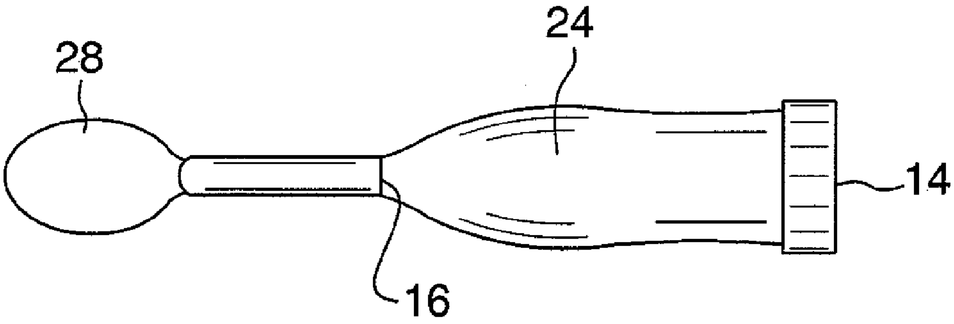
FIG. 4 is a bottom view of the present invention.

With reference now to the drawings, and in particular to FIGS. 1 through 6 thereof, a new food receiving infant feeding device embodying the principles and concepts of the present invention and generally designated by the reference numeral 10 will be described.

Figure 5:
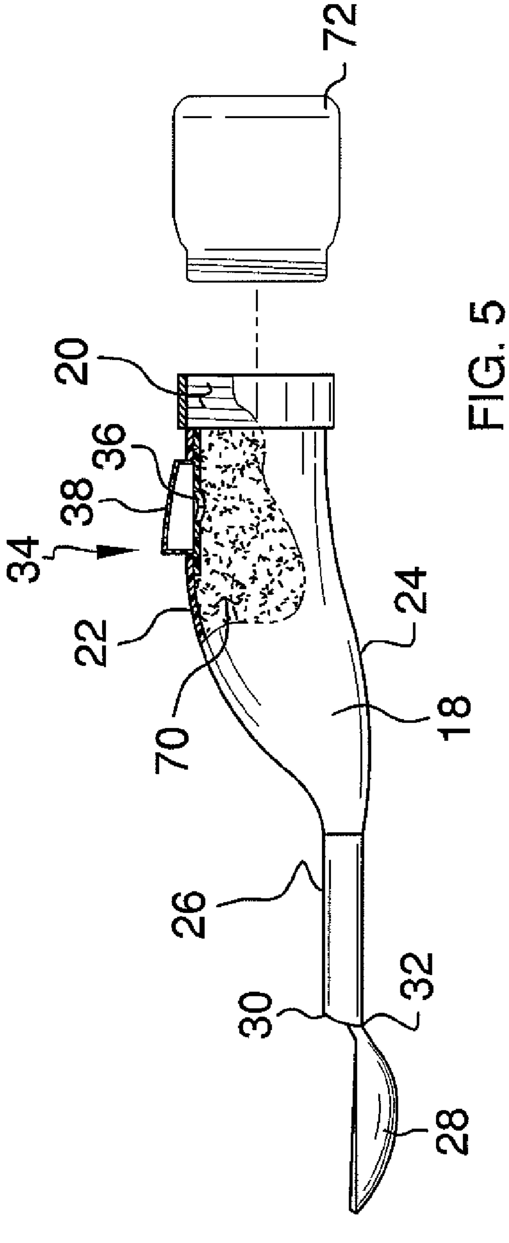
FIG. 5 is a side broken view of the present invention.
Figure 6:
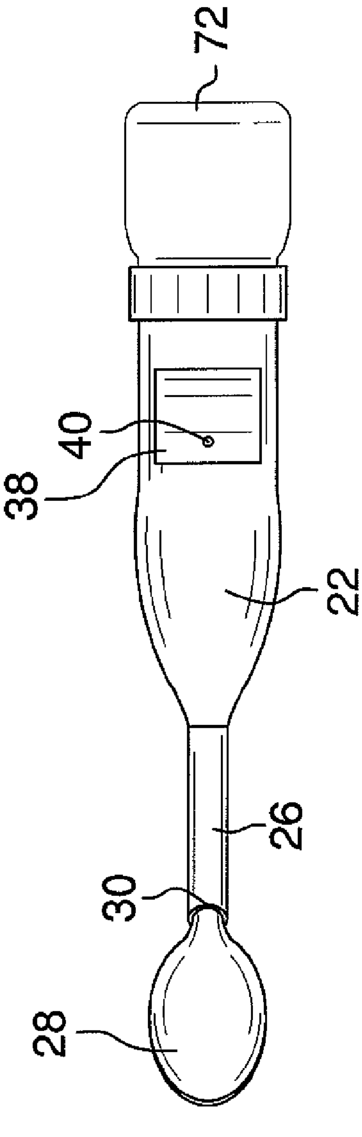
FIG. 6 is a top view of the present invention.

As best illustrated in FIGS. 1 through 6, the infant feeding device 10 generally comprises a tube 12 has a first end 14 and a second end 16, a peripheral wall 18 extending between the first 14 and second 16 ends. Each of the first 14 and second 16 ends is open and the peripheral wall 18 tapers inward from the first end 14 to the second end 16. An inner surface of the peripheral wall 12 adjacent to the first end 14 is threaded 20. The peripheral wall 18 includes an upper wall 22 and a lower wall 24. Each of the upper 22 and lower 24 walls arcs downwardly from the first end 14 to the second end 16. This positions the first end 14 higher than the second end 16 when the tube is horizontally orientated as is shown in FIG. 5. This shape will encourage food material 70 to move toward the second end 16.

A conduit 26 is fluidly coupled to the second end 16. The conduit 26 is removable from the second end 16 and frictionally engages the second end 16 through it may also be threadably coupled to the second end 16. A conventional spoon head 28 is attached to a distal end 30 of the conduit 26 with respect to the second end 16 of the tube. The distal end 30 is open and the spoon head 28 is positioned at a bottom portion 32 of the distal end 30 to receive food material 70 transferred through the conduit 26 from the tube 12.

An actuator 34 is mounted on the tube 12 to urge food material 70 in the tube 12 outwardly through the second end 16 of the tube 12. The actuator 34 includes a valve 36 positioned in the peripheral wall 18. The valve 36 is a one-way valve to allow air into the tube 12 but to restrict air from leaving the tube 12 through the valve 36. The actuator 34 further includes a pump 38 that is attached to the perimeter wall 12 and is in fluid communication with the valve 36 to force air through the valve 36 and into the tube 12 when the pump is actuated. The pump 38 may comprise a button having a hole 40 therein to receive air which can be forced through the valve 36 when the button is depressed. The button, or pump 38, may be comprised of a resiliently flexible material such as an elastomer or a plastic material.

In use, a threaded container 72 containing a selected food material 70 is threadably couplable to the perimeter wall 18. The container 72 may be a conventional baby food jar which typically has a threaded end. Once the container 72 is attached to the tube 12, the container 72 supplies the tube 12 with the food material 70 so that the food material 70 can be fed to an infant with the spoon head 28. A second one-way valve 42 may be positioned at a juncture of conduit 26 and the second end 16 of the tube 12 to prevent food from back flowing into the tube 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An infant feeding device comprising:

a tube having a first end and a second end and a peripheral wall extending between said first and second ends, each of said first and second ends being open;

a conduit being fluidly coupled to said second end;

a spoon head being attached to a distal end of said conduit with respect to said second end of said tube, said spoon head being positioned to receive food material transferred through said conduit from said tube;

an actuator being mounted on said tube to urge food material in said tube outwardly through said second end of said tube; and a container containing food material being removably coupled to said first end of said perimeter wall to supply the tube with the food material so that the food material can be fed to an infant with the spoon head, said container comprising a baby food jar having a male threaded end being threadably engaged to said first end, said first end comprising female threading.

2. The device according to claim 1, wherein an inner surface of said peripheral wall adjacent to said first end is threaded to be threadably couplable to the container.

3. The device according to claim 1, wherein said peripheral wall includes an upper wall and a lower wall, each of said upper and lower walls arcing downwardly from said first end to said second end.

4. The device according to claim 1, wherein said actuator includes a valve positioned in said peripheral wall, said valve being a one-way valve to allow air into said tube but to restrict air from leaving said tube through said valve, said actuator further including a pump being attached to said perimeter wall and being in fluid communication with said valve to force air through said valve and into said tube when said pump is actuated.

5. An infant feeding device comprising:

a tube having a first end and a second end and a peripheral wall extending between said first and second ends, each of said first and second ends being open, said peripheral wall tapering inward from said first end to said second end, an inner surface of said peripheral wall adjacent to said first end being threaded, said peripheral wall including an upper wall and a lower wall, each of said upper and lower walls arcing downwardly from said first end to said second end;

a conduit being fluidly coupled to said second end, said conduit being removable from said second end;

a spoon head being attached to a distal end of said conduit with respect to said second end of said tube, said spoon head being positioned to receive food material transferred through said conduit from said tube;

an actuator being mounted on said tube to urge food material in said tube outwardly through said second end of said tube, said actuator including a valve positioned in said peripheral wall, said valve being a one-way valve to allow air into said tube but to restrict air from leaving said tube through said valve, said actuator further including a pump being attached to said perimeter wall and being in fluid communication with said valve to force air through said valve and into said tube when said pump is actuated; and said first end comprising female threading being configured to be releasably engaged with male threading on a baby food jar to supply the tube with the food material so that the food material can be fed to an infant with the spoon head.

* * * * *